United States Patent [19] [11] 3,845,471

Reitbeock et al. [45] Oct. 29, 1974

[54] CLASSIFICATION OF A SUBJECT

[75] Inventors: Heribert J. P. Reitbeock; Thomas P. Brody, both of Pittsburgh, Pa.

[73] Assignee: Westinghouse Electric Corporation, Pittsburgh, Pa.

[22] Filed: May 14, 1973

[21] Appl. No.: 360,272

[52] U.S. Cl. ........................ 340/149 R, 340/173 AM
[51] Int. Cl. .......................... G11c 15/00, G06g 7/19
[58] Field of Search ...... 340/166 R, 166 FE, 149 R, 340/173 AM, 173 NR; 307/279, 304

[56] References Cited

UNITED STATES PATENTS

| | | | |
|---|---|---|---|
| 3,723,979 | 3/1973 | Mundy | 340/173 AM |
| 3,740,731 | 6/1973 | Ohwada et al. | 307/279 X |
| 3,740,732 | 6/1973 | Frandon | 307/279 X |
| 3,750,115 | 7/1973 | Mundy | 340/173 AM |
| 3,760,378 | 9/1973 | Burns | 307/279 X |
| 3,761,898 | 9/1973 | Pao | 307/279 X |
| 3,761,901 | 9/1973 | Aneshansley | 307/279 X |

*Primary Examiner*—Donald J. Yusko
*Attorney, Agent, or Firm*—D. Schron

[57] ABSTRACT

Classification of a subject is effected by a learning matrix whose adaptive elements are minstors disposed in columns and rows. A different pattern of stored comparison characteristics is impressed as respective flatband voltages on the minstors of each row of the matrix. Voltages corresponding to the actual characteristics of the subject are impressed each along a column of the matrix. Assuming there are *m* rows and *n* columns and regarding the parameters impressed on each row as an *n* dimensional vector, the comparison of the actual characteristics with each pattern of comparison characteristics is effected by comparing, for each row, either the angle between these vectors or the Euclidean distance between the vectors.

11 Claims, 16 Drawing Figures

CLASSIFICATION OF A SUBJECT

CROSS-REFERENCE TO RELATED DOCUMENTS

The following documents are incorporated herein by reference

1. Application Ser. No. 293,241 filed Sept. 28, 1972 to Herbert J. P. Reitboeck and Thomas Peter Brody and assigned to Westinghouse Electric Corporation.
2. J. R. Szedon — *An Insulated -Gate Field Effect Transistor, Non-Volatile Memory Element Using Tunnel Trapping in a Double Layer Dielectric* — Westinghouse Scientific Report 68-1F1-SOISS-R1 (1968).
3. J. R. Szedon and R. M. Handy — *Characterization, Control, and Use of Dielectric Charge Effects in Silicon Technology* — Journal of Vacuum Society Tech 6, 1 (1969).
4. K. K. Yu, G. A. Gruber and J. R. Szedon, *Evidence of Hole Injection in MNOS Memory Devices*, Device Research Conference — Seattle, Wash., 1970.
5. H. Reitoeck — Content Addressible Associative Memories Using Steinbuck-Type Learning Matrices — Westinghouse Research Memo 67-1F1-FILMD-M2.

BACKGROUND OF THE INVENTION

This invention relates to classification or identification and has particular relationship to classification or identification with the aid of a learning matrix. A learning matrix is a circuit structure which includes a plurality of adaptive elements, each having facilities for receiving signals in comparison relationship and capable of changing its "weight", as manifested by an electrical or electromagnetic property, typically electrical conductivity responsive to the relationship between the received signals. For the purpose of describing the learning matrix and its uses, the adaptive elements of a matrix may be regarded as disposed in $m$ rows and $n$ columns. It is to be understood that physically this disposition may not necessarily exist; the adaptive elements may be mounted on a panel in any convenient manner or may be bits of a computer, but the signal terminals for each element and its output terminal must be so disposed that each element can be identified as electrically disposed at the intersection of a row, for example, the ith row, and a column, for example, the $j$th column, and produces an output, typically current, in a particular row, the $i$th row. In this application the symbol $i$ is used to identify any of the rows between the first and the $m$th and the symbol $j$ any of the columns between the first and the $n$th.

Classification of a subject involves comparison of the actual characteristics of the subject with the known characteristics of all, or as many as are available, of the members of the class of the subject. The sets of known characteristics of the members of the class of the subject are herein called comparison characteristics. The learning matrix can be operated in two ways. The $n$ actual characteristics may be compared with $m$ patterns of comparison characteristics or successive sets or $n$ comparison characteristics may be compared with $m$ patterns of actual characteristics. The comparison of actual characteristics with m patterns of comparison characteristics is usually preferred since all comparison characteristics are simultaneously addressed and classification or identification is instantaneously available. To avoid prolixity this application will concern itself concretely with this latter mode of operation; comparison of $n$ actual characteristics with $m$ patterns of comparison characteristics.

In classifying a subject a different pattern of $n$ signals, usually voltages, corresponding to comparison characteristics are typically impressed on the adaptive elements of each row of the $m$ rows. Each signal corresponds to a comparison characteristic or feature of the subject which is being classified, and the patterns correspond to all, or as many as are available, sets of characteristics or features of the members of the class of the subject. There may be hundreds, thousands or even millions of patterns. Typically, these patterns are stored in the memory of a computer for use in the matrix. $n$ signals, each corresponding to one of the $n$ actual characteristics of the subject, are impressed on the adaptive elements of each column. The outputs, usually the currents, of the rows are compared and the row delivering the optimum (maximum or minimum, as the case may be) output is evaluated to determine the match between the comparison patterns of characteristics or features and the pattern of actual characteristics.

The subject under comparison may be animate or inanimate and the characteristics evaluated may vary over a wide range. Typically, the subject may be a radar as disclosed in application Ser. No. 293,241. The learning matrix may also determine the mean square deviation for $m$ sets of data of $n$ items each from sets stored in a memory. Actual characteristics of an invention may be compared with the comparison characteristics of related references. The references may be a patent sub-class or class or even the whole gamut of patents. Proposed legislation may be compared with legislation enacted in the past whose characteristics are stored in a memory. In the same way the actual characteristics of a case, as to which advice is sought, may be compared with the characteristics of like adjudicated cases. People may be identified by their characteristics based on data stored in a central data memory bank.

In accordance with the teachings of the prior art, classification is carried out with electrochemical memory cells as adaptive elements. These are used in Perceptrons (F. Rosenblatt-*Principles of Neurodynamics*, Spartan Books, Washington, D.C.). Or the adaptive elements are magnetic storage elements of the transfluxor type [K. Steinbuch—*Die Lernmatrix* Kybernetik 1, 36 (1961); H. Kazmierczak and K. Steinbuck-—*Adaptive Systems in Pattern Recognition* IEEE Transactions, EC-12, 822 (1963); P. Müller, Aufbau and *Eigenschaften von Lernmatrizen fur Nichtbinare Signale*, Kybernetik 2, 102 (1964)].

Electrochemical cells are large; a matrix of a large number of such cells as adaptive elements would occupy a large volume or area. These cells are also unreliable and they do not have the facility of producing outputs simulating arithmetic functions, for example, square functions. In the case of magnetic-storage elements, care must be taken after each operation to write the date into the elements. Magnetic elements with non-destructive memory facility are available but the read-out of analog values (stored magnetism) is complicated. For example, the read-out must take place by generation of a second harmonic.

It is an object of this invention to overcome the disadvantages of the prior art and to provide reliable classification apparatus having adaptive elements with memory facility which shall permit the reliable storing of data in a simple manner and the read-out from which shall not affect the stored data; the said elements also being so small that a matrix including hundreds, thousands or even millions of elements occupies a volume or area of reasonable dimensions. It is also an object of this invention to provide a method of classifying subjects which is unique to these small reliable elements.

SUMMARY OF THE INVENTION

In accordance with this invention, classification apparatus is provided including a learning matrix whose adaptive elements are minstors. There is also provided a method of classifying by unique control of this matrix. A minstor is a solid-state field-effect transistor having a gate, a source and a drain, and it operates on the basis of tunnel trapping of charges in an insulator between its gate and its substrate. By impressing an appropriate voltage on the gate of a minstor for an appropriate time interval, a voltage, herein called a flat-band voltage, is locked on the gate and this flat-band voltage controls the subsequent operation of the minstor. The drain current of the minstor is determined by the flat-band voltage and also by the relationship between a gate voltage subsequently impressed, and to be distinguished from the flat-band voltage, and the flat-band voltage.

In the practice of this invention the minstors of the matrix operate as memory elements with the flat-band voltage on each minstor representing an item of stored data. The matrix has *n* columns and *m* rows of minstors. A stored comparison characteristic is simulated by a flat-band voltage in each minstor, each row of minstors storing a pattern of *n* characteristics and the matrix storing *m* patterns. The *n* actual characteristics are simulated by *n* voltages which are impressed on the minstors in comparison relationship with the flat-band voltages. The *n* flat-band voltages and the *n* actual-characteristic voltages may each be regarded as an *n*-dimensional vector. The classification or comparison may be effected either by comparing the angles between the flat-band voltage vector for the respective rows and the actual characteristic vector to determine the row for which this angle is a minimum or by comparing the Euclidean distance between the flat-band voltage vector and the actual-characteristic vector and determining for which row (pattern) the distance is an optimum (maximum or minimum). The angle between the flat-band voltage vector for each row and the actual-characteristic vector is determined by impressing voltages, corresponding to each actual characteristic, on the sources and drains of the minstors along corresponding columns, grounding the gates of the minstors and recording the row drain currents and then dividing this magnitude by the square root of the saturation drain current for the minstors. The row with the highest quotient (highest cosine) presents the best-match pattern. The Euclidean distance is determined by impressing voltages, each corresponding to an actual characteristic, on the gates of the minstors along the columns of the matrix and measuring the saturation current for each row. The row with the lowest saturation current presents the best-match pattern. The actual-characteristic voltages, in this case impressed on the minstors, are substantially lower (1 to 10 volts) than the voltages (40 to 50 volts) which are impressed to produce the locked flat-band voltage and have no effect on the flat-band voltages which simulate the comparison characteristics.

The minstors are solid-state elements which may be deposited in large numbers on ceramic or plastic substrates or produced as monolithic units. The learning matrix which the practice of this invention demands with hundreds, thousands or millions of adaptive elements is then readily feasible. The minstors are highly reliable; the characteristics may be simulated accurately by the flat-band voltages where necessary. The memory and logic can be integrated in a minstor since a minstor can perform arithmetic operations. The read-out of data from the minstors in the matrix does not change the flat-band voltages on the minstor and thus the read-out does not destroy or change the data in the memory of a minstor. The minstors permit storage of analog as well as digital data. Minstors can be produced with control gates as well as memory gates and the minstors in the matrix may thus serve to realize highly specific functions.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF INVENTION

Figure 1:
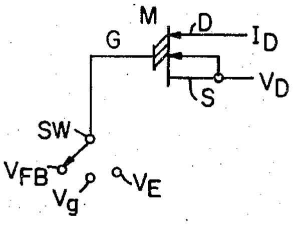
FIG. 1 is a fragmental schematic which serves to explain the basic features of a minstor applied in the practice of this invention.

The circuit shown in FIG. 1 includes a minstor M having a gate G, a source S and drain D. Typically, a polarizing or flat-band or memory voltage, $V_{FB}$, is impressed on the gate G via a polarizing voltage applied for an appropriate interval through a switch SW. The flat-band or memory voltage $V_{FB}$ may be erased by applying an erasing voltage $V_E$ through the switch SW. In addition, a gate voltage $V_g$ is also applied to the gate G through the switch SW. It is contemplated that in each case appropriate voltages are applied by means (not shown in FIG. 1) to the source S and drain D separately or interconnected. A drain current $I_D$ flows between the source S and drain D under appropriate conditions. It is contemplated that the switch SW and the other switches included in the apparatus disclosed herein are electronic switches typically as disclosed in application Ser. No. 293,241.

Figure 2:
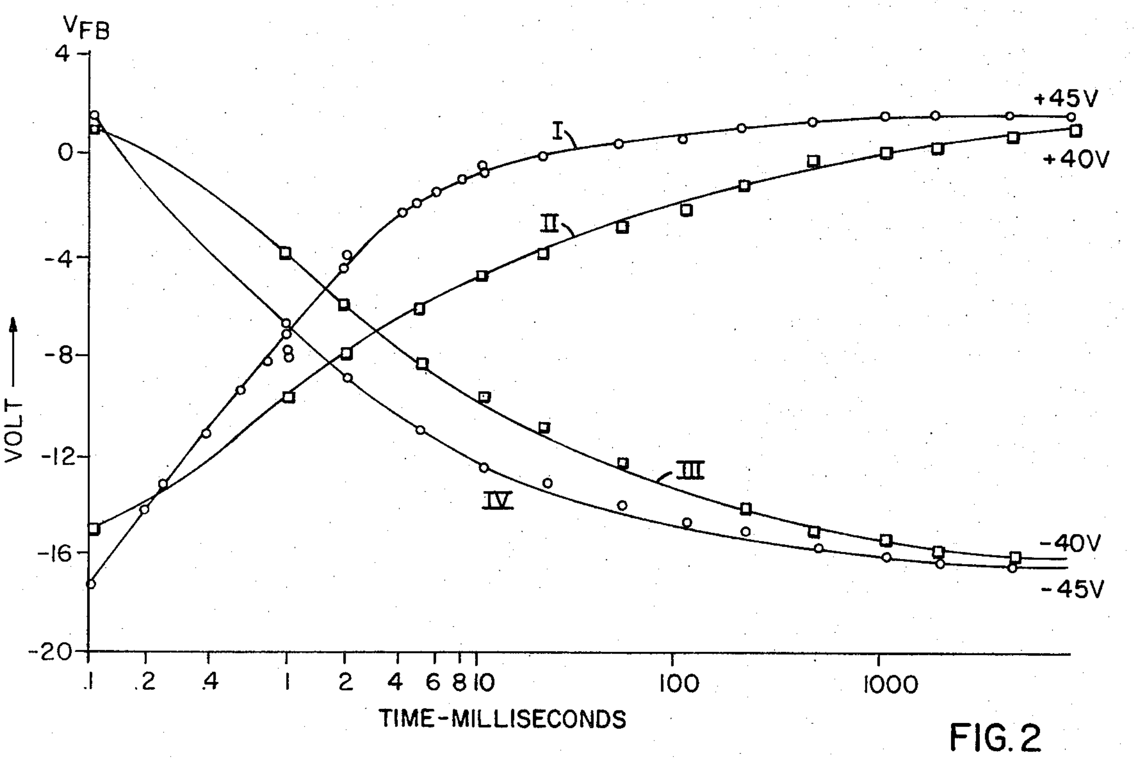
FIG. 2 is a graph illustrating the manner in which flat-band voltage is applied to, and erased from, a minstor.

FIG. 2 shows the manner in which a predetermined flat-band voltage, $V_{FB}$, is impressed on, or erased from, the gate G of minstor M. $V_{FB}$, is plotted vertically in volts and time horizontally in milliseconds. A predetermined flat-band voltage is impressed by applying a voltage, typically, if about −40 or −45 volts between the gate G of a minstor and the source S substrate and drain D connected together for a predetermined time interval.

Essentially the flat-band voltage $V_{FB}$ is impressed or erased by impressing the appropriate polarizing voltage between the memory gate G and the substrate. Another way of impressing or erasing flat-band voltage is to impress the polarizing voltage between the gate and the source with the drain open-circuited or floating or between the gate and a separate electrode connected to the substrate with the source and drain floating.

Curve I presents $V_{FB}$ as a function of time for +45 volts between the gate G and source S and drain D and curve II for +40 volts. The gate G is thus electrically set by writing voltages. $V_{FB}$ is predominately negative increasing from −17 volts to about +15 volts for −45 volts writing voltage and from −15 volts to 0 volts for −40 volts. Curves III and IV show the corresponding time functions for the gate G electrically negative with respect to the source S and drain D. Either function may be used for writing and the opposite polarity function for erasing. However, functions I and II are preferred because they rise relatively sharply and substantially linearly, in region of short time durations, .1, .2, .4 milliseconds.

Once $V_{FB}$ is impressed, the current conducted by a minstor, below saturation, is given by $$I_D = (\mu \text{ w } C/l)\,[(V_g - V_{FB}) \cdot V_D - (V_D^2/2)] \qquad (1)$$

wherein:

$L$ = source-drain spacing
$I_D$ = drain current
$\mu$ = mobility of carriers (electrons or holes)
$w$ = (geometrical) width of channel
$C$ = capacity per unit area of gate insulator
$V_g$ = gate voltage impressed
$V_{FB}$ = flat-band voltage $V_D$ = voltage impressed between source and drain.

The saturation current is given by:

$$I_{DSAT} = (\mu \text{ w } C/2L)(V_g - V_{FB})^2 \qquad (2)$$

The polarities of the current and the voltages are governed by whether the minstor is a p-channel or n-channel device, the $p$ and $n$ referring to the polarities of the source and drain and the substrate being of opposite polarity, $n$ or $p$ respectively.

Figure 7:
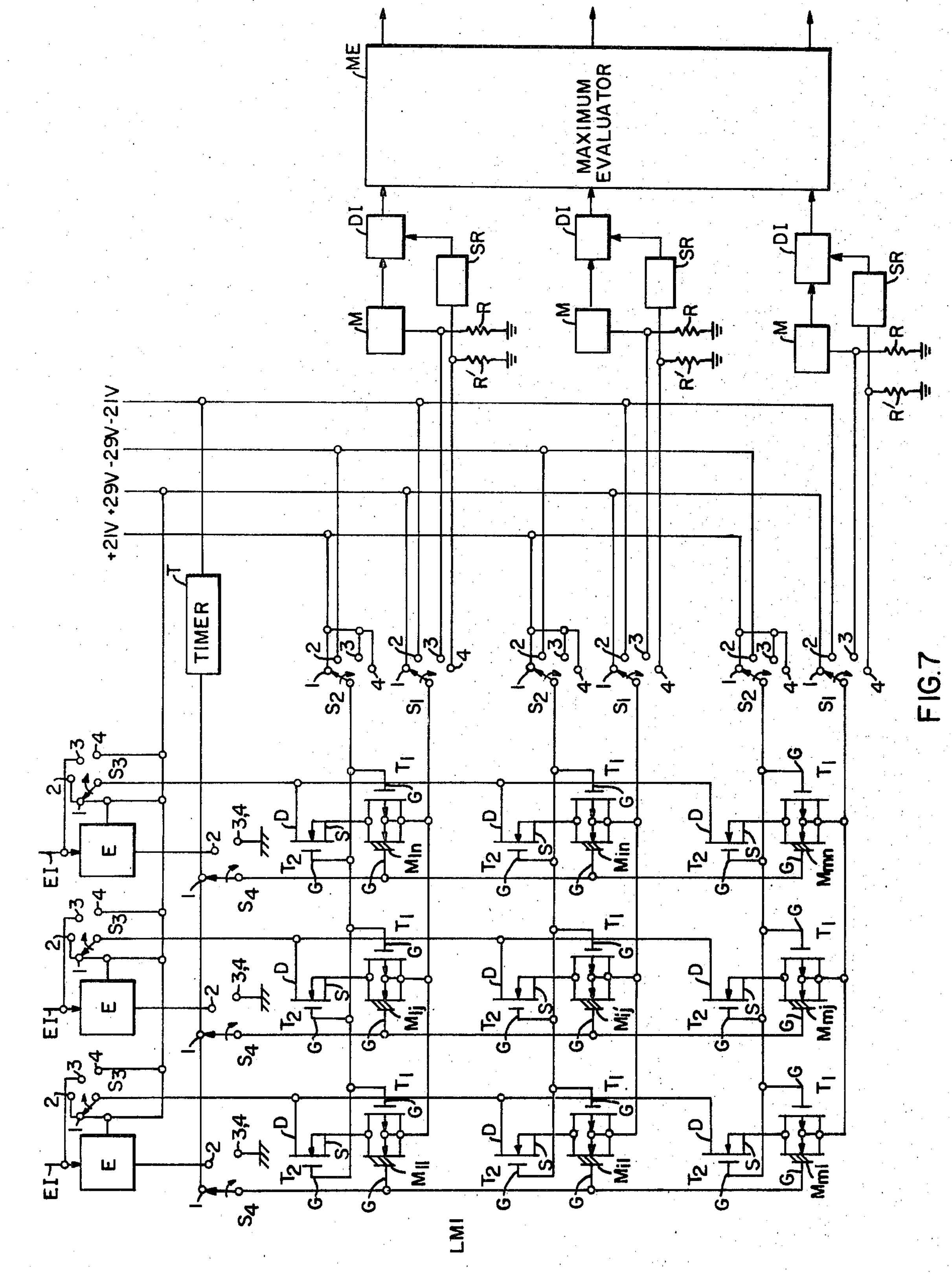
FIG. 7 is a schematic showing apparatus in accordance with this invention in which the angles between comparison-characteristics vectors and an actual-characteristics vector are compared.

FIG. 7 shows a learning matrix LM1 having $n$ columns (only the first, the $j$th and $n$th shown) and $m$ rows (only the first, the $i$th and the $m$th shown). In each row there are minstors typified by the minstors $M_{1l}$, $M_{1j}$, and $M_{1n}$ in the first row, $M_{il}$, $M_{ij}$, and $M_{in}$ in the $i$th row and $M_{m1}$, $M_{mj}$, and $M_{mn}$ in the $m$th row. Any minstor in the matrix LM1 is designated generally as $M_{ij}$ where $i$ is 1 through $m$ and $j$, 1 through $n$.

It is assumed that on the gates G of the minstors of each row a pattern of flat-band voltages simulating comparison characteristics are impressed. For the $i$th row and the $j$th column, this voltage is designated $W_{ij}$ and for the $i$th row, the pattern characteristic vector is $Wi$.

It is also assumed that a set of voltages $e$ through $e_n$, simulating actual characteristics, are impressed on the minstors along the columns 1 through $n$. The actual-characteristic vector is designated $\vec{e}$, and any voltage or component of the vector is designated $e_j$ consistent with the labeling of FIG. 7.

The effect of impressing a voltage $e_j$ along a column $j$ on whose minstors voltages $W_{1j}$ through $W_{mj}$ are impressed is to set the conductivities $G_{1j}$ through $G_{mj}$ of the minstors in the column. The minstors $M_{ij}$ in each row are connected to supply the drain current to the respective resistors R and R' (FIG. 7) and the current $I_i$ which flows through any row $i$ is given by:

$$I_i = \sum_{j=1}^{j=n} G_{ij} e_j \qquad (3)$$

where $G_{ij}$ is the respective conductivity of each minstor $M_{ij}$ in the row.

The angle $\psi_i$ between the vectors $\vec{e}$ and $\vec{W}_i$ for row $i$ is derived from the dot product and is given by:

$$\cos \psi_i = \vec{e} \cdot \vec{W_i} / |\vec{e}| \cdot |\vec{W_i}| \qquad (4)$$

where $|\vec{e}|$ and $|\vec{W_i}|$ are the scalar magnitudes of the vectors $\vec{e}$ and $\vec{W_i}$. The scalar magnitude of a vector is equal to the square root of the sum of the squares of its components and Equation 4 can be written:

$$\cos \psi_i = \frac{\vec{e} \cdot \vec{W}_i}{\sqrt{\sum_{j=1}^{n} e_j^2}\,\sqrt{\sum_{j=1}^{n} W_{ij}^2}} \qquad (5)$$

for the $i$th row:

$$\vec{e} \cdot \vec{W}_i = \sum_{j=1}^{n} e_j W_{ij} \qquad (6)$$

where $e_j$ and $W_{ij}$ are the components in the $n$ dimensions of $\vec{e}$ and $\vec{W}_i$. Equation 5 can then be written:

$$\cos \psi_i = \frac{\sum_{j=1}^{n} e_j W_{ij}}{\sqrt{\sum_{j=1}^{n} e_j^2}\sqrt{\sum_{j=1}^{n} W_{ij}^2}} \quad (7)$$

In Equation 7 the set $e_1$--$e_j$--$e_n$ is the same for all rows $i$ so that $$\sum_{j=1}^{n} e_j^2$$

is a constant. In evaluating the angles $\psi_i$ for the various rows it is necessary only to determine the relative and not the absolute differences between the angles. Since the relative differences are affected in the same way be dividing the cosines by the same factor, the angle criterion for the matrix LM1 can be evaulated by determining the magnitude:

$$\frac{\sum_{j=1}^{n} e_j W_{ij}}{\sqrt{\sum_{j=1}^{n} W_{ij}^2}} \quad (8)$$

With reference to Equation (1), the total current $I_D$ for any row $i$ $$I_{D_i} = \frac{\mu w C}{L}\left(\sum_{j=1}^{n} V_{g_{ij}} \cdot V_{D_j} - \sum_{j=1}^{n} V_{FB_{ij}} \cdot V_{D_j} - \sum_{j=1}^{n} V_D \frac{V_{D_{ij}}^2}{2}\right) \quad (9)$$

In the practice of this invention, in comparing by angle evaluation, the actual characteristic and the comparison characteristics, the source-drain voltages $V_{D_{ij}}$ for the columns 1 through $n$ simulates the one set of actual-characteristics; they are impressed along the columns and are the same for all rows.

$$\sum_{j=1}^{n} \frac{V_{D_{ij}}^2}{2}$$

is then a constant for all rows and may be disregarded where the differences between the $I_{D_i}$'s for the different rows are compared. Also in the practice of this invention in the same comparison, $V_{g_{ij}}$ is set to 0 or the voltage reference, usually ground, for all minstors of row $i$. To evaulate $I_{D_i}$ for each row then it is necessary to evaluate only $$-\sum_{j=1}^{n} V_{FB_{ij}} \cdot V_{D_{ij}} \quad (10)$$

where $V_{FB_{ij}}$ is negative (graphs I and II, FIG. 2). Expression 10 is the numerator of Expression 8.

The denominator of Expression 8 is derived from Equation 2.

$$I_{DSAT_i} = \frac{\mu w C}{2L}\sum_{j=1}^{n}(V_{g_{ij}} - V_{FB_{ij}})^2 \quad (11)$$

In this case, in the practice of this invention, $V_{g_{ij}}$ is set to ground for all minstors of row $i$ and the source-drain voltage is set to saturation magnitude. Equation 11 becomes $$I_{DSAT_i} = \frac{\mu w C}{2L}\sum_{j=1}^{n} V_{FB_{ij}}^2 \quad (12)$$

Figure 3:
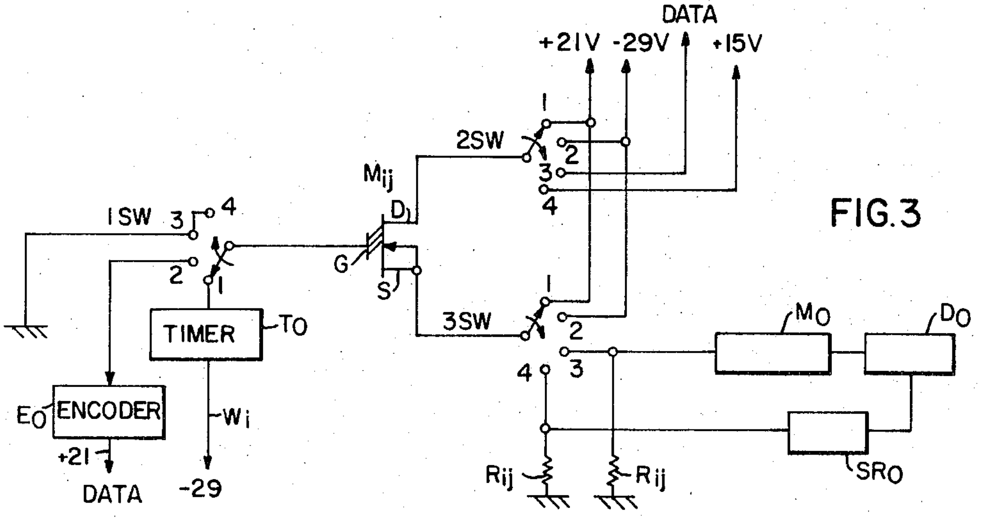
FIG. 3 is a fragmental schematic showing typical application of erase, classify or read-out, and write voltages to one of the minstors of a matrix in the practice of this invention in the determination of the angle between the comparison-characteristics and the actual-characteristics vectors for any row and the computation of the cosine of the angle.
Figures 4A, 4B, 4C, 4D:
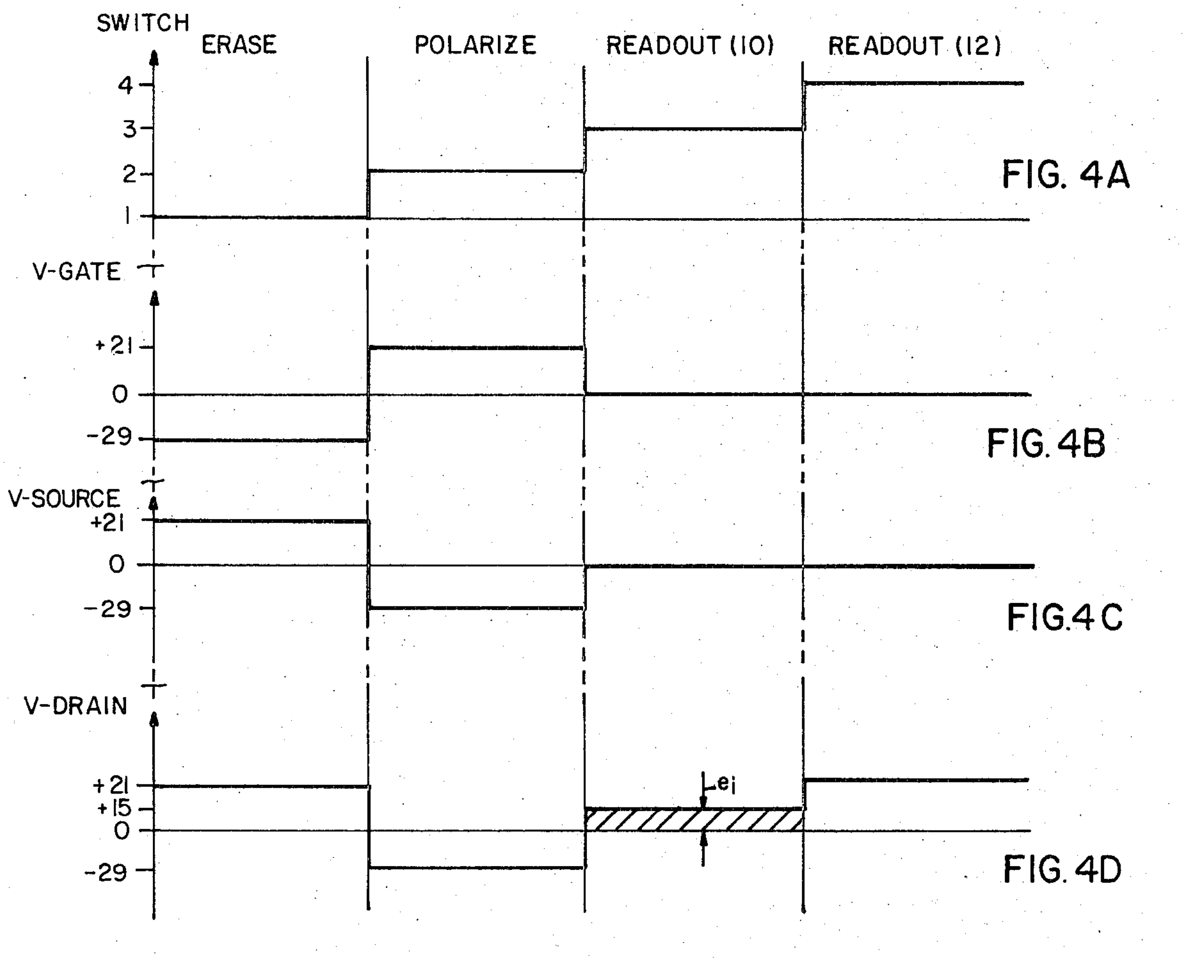
FIGS. 4A, B, C, D constitute a flow chart for FIG. 3.

The basic practice of this invention, in angle evaluation, is illustrated in FIGS. 3 and 4A–C in the control of a typical minstor $M_{ij}$ of the learning matrix. $M_{ij}$ is assumed to be an $n$-channel minstor. The voltages impressed on the minstor $M_{ij}$ and its output current through output resistors $R_{ij}$ and $R'_{ij}$ are controlled by switches 1SW, 2SW, 3SW which operate together sequentially through positions 1, 2, 3, 4 engaging the same contacts 1, 2, 3, 4 in each position. The switches 1SW, 2SW, 3SW symbolize the switching of each minstor $M_{ij}$ and may be regarded as electronic switches. FIGS. 4A–C presents a flow diagram for the minstor $M_{ij}$ as it is controlled by switches SW1–SW3 through the steps Erase, Polarize (impress comparison characteristics), Readout (10) (Expression 10), Readout (12), (expression 12).

FIGS. 4A, B, C, D are four graphs. In all graphs time is plotted as abscissa and points at the same abscissa in all four graphs are assumed to occur at the same instant. In graph 4A, switch position is plotted as ordinate and in the other graphs, 4B–4D, the voltages which are impressed through switches 1SW, 2SW, 3SW respectively are plotted as ordinates.

In positions 1 of the switches, (left-hand sections of graphs 4A, 4B, 4C, 4D) switch 1SW impresses –29 volts (typically) on gate G through the timer $T_o$ and switches 2SW and 3SW impress +21 volts (typically) on the source S and drain D connected together. The total voltage impressed is 50 volts and the timer $T_o$ maintains this voltage on gate G and source S and drain D for an interval long enough to erase any flat-band voltage on gate G which may have been impressed during an earlier operation (FIG. 2, curves III, IV).

In switch position 2 the comparison-characteristic data is impressed on gate G through the Encoder $E_o$. Encoder $E_o$ is essentially a variable timer which impresses +21 volts on the gate G and –29 volts on the source S and drain D connected together for a time interval set in accordance with the item of comparison-characteristic data $W_i$ to be impressed on the minstor $M_{ij}$ (See application Ser. No. 293,241). As shown in FIG. 2, curves I and II, a flat-band voltage $V_{FB}$, which is a measure of the item of data, is thus impressed on the minstor $M_{ij}$. For example, if the encoder $E_o$ times for 10 milliseconds, $V_{FB}$ is about –6 volts. The flat-band voltages impressed may be analog or digital magnitudes as the characteristic under consideration may demand.

In position 3 of switches 1SW, 2SW, 3SW, the corresponding item of actual-characteristic data $\vec{e}_i$ is impressed as a voltage of appropriate magnitude between the drain D and the source S and the gate G is at the same time grounded. Current $I_{D_{ij}}$, which measures one of the terms, $V_{FB_{ij}} \cdot V_{D_{ij}}$, of Expression 10, then flows between the drain D and the source S through resistor $R_{ij}$. The drop across this resistor measures this current and is recorded in memory $M_o$.

In position 4 of switches 1SW, 2SW, 3SW, saturating voltage, typically, +15 volts is impressed between the drain D and source S while the gate G remains grounded. Current $I_{DSAT_{ij}}$ then flows between the drain D and the source S and this current measures one term $V_{FB_{ij}}^2$ of Expression 12. This current flows through resistor $R'_{ij}$ and the drop across resistor $R'_{ij}$ is impressed on square root deriver $SR_o$. The item recorded in memory $M_o$ is then divided by the item recorded in $SR_o$ by divider $D_o$ to evaluate the cosine between the components compared.

The processing of data shown in FIGS. 3 and 4 is presented only in the interest of clarifying the understanding of this invention. In the actual practice of this invention, rather than a single minstor $M_{ij}$, each row and each column of the matrix of minstors is processed. Such processing is shown in FIG. 7.

In FIG. 7 switching transistors $T_1$ and $T_2$ are associated with each minstor $M_{11}$ through $M_{mn}$ (herein referred to as $M_{ij}$). Transistor $T_2$ is of the negative (n) channel type and transistor $T_1$ of the positive (p) channel type. The source S and drain D of $T_1$ are connected respectively to the source S and drain D of the associated minstor $M_{ij}$. The source S of $T_2$ is connected to the drains D of $T_1$ and of the associated minstor $M_{ij}$.

The apparatus shown in FIG. 7 also includes a plurality of encoders, one for each of the n columns of the matrix. There are also a plurality of intelligence input conductors EI, one for each column. Each conductor EI is connected to an associated encoder E to set the encoder E for the data which it is to impress on the matrix. Switches $S_1$ and $S_2$ are associated with each row of the matrix and switches $S_3$ and $S_4$ are associated with each column. Switches $S_1$ and $S_2$ each have four positions, 1, 2, 3, 4; switch $S_3$ has three positions, 2, 3 and 4; and switch $S_4$, three positions, 1, 2, 3–4. The wipers of switch $S_1$ are each connected to the sources S of $T_1$ and $M_{ij}$ of the associated row and the wipers of $S_2$ to the gates of $T_1$ and $T_2$ of the associated row. The wipers of $S_3$ are each connected to the drains D of $T_2$ of the associated column and the wipers W of $S_4$ to the gates G of the minstors $M_{ij}$ of the associated column. Output resistors R and R', memory M, divider DI and square root derivers DI are associated with each row of the matrix. The outputs of the dividers DI are supplied to a maximum evaluator ME.

In position 1 each switch $S_1$ is connected to +29 volts, in position 2 to −21 volts, in position 3 to the junction of the associated memory M and resistor R, and in position 4 to the junction of the deriver SR and resistor R'. In position 3 the drop across resistor R is supplied to the memory M and in position 4, the drop across resistor R' is supplied to SR. In positions 1, 3 and 4, each switch $S_2$ is connected to +21 volts, and in position 2 to −29 volts. In position 3 each switch $S_3$ is connected to the associated conductor EI and to the associated encoder E and in position 4 to +29 volts. In position 1 each switch $S_4$ is connected to −21 volts through the timer T, in position 2 to the output of the associated encoder E and in position 3–4 to ground. Encoder E is connected to +29 volts.

The switches $S_1$ through $S_4$ are electronic switches. The voltages ±21 and ±29 are typical but can vary over a wide range according to the transistors used. For all switches $S_1$ through $S_4$, position 1 is erase, position 2 write or encode, positions 3 and 4 read and compute.

Operation of FIG. 7

The operation starts with the switches $S_1$ through $S_4$ in the positions shown in FIG. 7. In this setting, +21 volts is impressed on the gates of $T_2$ and $T_1$ and +29 volts on the source of $T_1$. All $T_1$'s conduct, interconnecting the sources S and the drains D of all minstors $M_{ij}$ in the addressed row and also impressing +29 volts on the sources S of $T_2$. $T_2$ which is an n-channel transistor remains non-conducting since its gate is at +21 volts and therefore negative with respect to the source. There is +29 volts on the source S and drain D of each minstor. Through switch $S_4$, −21 volts is impressed through timer T on the gate G of each minstor. The timer T times long enough to erase the flat-band voltage setting of all minstors in the addressed row (FIGS. II, III, IV).

The encoders E, which may be variable timers as shown in application Ser. No. 293,241, are now set, by impressing the pattern signals on the associated EI conductor, to impress a pattern of comparison characteristics on the minstors $M_{11}$ through $M_{1n}$ of the first row of the matrix and the switches $S_1$ and $S_2$, associated with the first row, and all switches $S_4$ are set in position 2. Switches $S_1$ and $S_2$ associated with the other rows remain in position 1. Switch $S_1$ impresses −21 volts on the sources S of T3 of the first row; $S_2$ impresses −29 volts on the gates G of $T_2$ and $T_3$. $T_3$ conducts, connecting the sources S and drains D of the minstors of the first row to each other with −21 volts on the sources S and drains D of the minstors of the first row. Switches $S_4$ impress +29 volts on the gates G of the minstors $M_{11}$ through $M_{1n}$ of the first row through the respective encoders E. Each encoder maintains the 50 volts between the gate G and source and drain of the associated minstor long enough to impress the appropriate flat-band voltage, $V_{FB}$, on the minstor, each flat-band voltage corresponding to the comparison-characteristic component selected. As to the other rows of the matrix for which switches $S_1$ and $S_2$ are in position 1, the sources S and the drains D of all minstors are at +29 volts and during encoding of the first row the gates G of these minstors are also at +29 volts. These minstors are then not affected by the encoding of the minstors $M_{11}$ through $M_{1n}$ of the first row.

The encoders E are next set for impressing another pattern of comparison-characteristics. Switches $S_4$ remain in position 2 while switches $S_1$ and $S_2$ of the first row of the matrix are reset to position 1 and switches $S_1$ and $S_2$ of the second row are set in position 2. Flat-band voltages corresponding to a second pattern of characteristics are impressed on the second row. The above-described process is repeated for the *m* rows $M_{11} - M_{1n}$, $M_{i1} - M_{in}$, $M_{m1} - M_{mn}$ of the matrix LM1.

M patterns of comparison-characteristics are now impressed on matrix LM1. All switches $S_1$ and $S_2$ are at this point in position 1 and all switches $S_4$ in position 2. Depending on the subject under consideration the patterns may be in digital or in analog form. Typically, a pattern fo a patent sub-class may be in analog form, a number being assigned to each of the constituents or structural components of the sub-class or the presence or absence of a constituent indicated by a 1 or a 0.

To carry out a comparison, all switches $S_1$, $S_2$, $S_3$ and $S_4$ are set in position 3. Voltages corresponding to the components of the actual characteristics are impressed on the conductors EI.

The actual-characteristic voltages are in analog or digital form corresponding to the form of the comparison-characteristic voltages. For example, the presence or absence of a constituent or structural component in an invention being searched may be indicated by a 1 or a 0. A different constituent component in the invention than in a pattern is indicated by the opposite, a 0 or a 1, to the indication in the pattern.

In position 3 all sources S of $T_1$ are conducted to ground through switch $S_1$ and resistor R and all gates of $T_2$ and $T_1$ to +21 volts. The $T_1$'s are non-conducting. The sources of $T_2$ are connected to the ground through the source and drain path of the minstor $M_{ij}$, which may be of high resistance but still maintains the sources S of $T_2$ at lower voltage than the +21 volts on the gates. Each $T_2$ then conducts, impressing the voltage impressed from its associated EI conductor, through its associated switch $S_3$, between the source S and drain D of its associated minstor $M_{ij}$. The same voltage from EI is impressed on all the minstors along the column to whose transistors $T_2$ the conductor EI is connected. With $S_4$ in position 3 the gates of all minstors $M_{11}$ ciated minstors $M_{ij}$. Through $S_3$ in position 4 and each conducting $T_2$, +29 volts is connected to each source and each drain.

Each resistor R' now carries the saturation current for its associated row. This current is the current $I_{DSAT_i}$ defined by Equation 12 and is proportional to:

$$\sum_{j=1}^{n} V_{FB_{ij}}^2$$

for each row *i*. A magnitude corresponding to $I_{DSAT_i}$ is impressed on each deriver SR. Each divider DI divides:

$$\sum_{j=1}^{j=n} V_{FB_{ij}} \cdot V_{D_{ij}}$$

by $$\sqrt{\sum_{j=1}^{j=n} V_{FB_{ij}}^2}$$

for each row producing a measure of cos$\psi i$, $\psi i$ being the angle between actual-characteristic vector and the comparison characteristic vector. The maximum evaluator ME compares the outputs of the dividers and selects for processing the maximum quotient. The sequence of operations described above is shown in the following.

TABLE I

| | Not add. row k | | Add. row i | | Not addressed row k | Addressed row i |
|---|---|---|---|---|---|---|
| | $T_1$ | $T_2$ | $T_1$ | $T_2$ | Minstor $M_{Kj}$ | Minstor $M_{ij}$ |
| Erase $S_3$ and $S_4$ Position 1 | Conducts $V_g$ $V_s$ | Does not conduct $V_g$ $V_s$ | Conducts $V_g$ $V_s$ | Does not conduct $V_g$ $V_s$ | $V_g = -21V$ $V_sD = -21V$ $S_1$ Pos. 2 $S_2$ Pos. 2 | $V_g = -21V$ $V_sD = +29V$ $S_1$ Pos. 1 $S_2$ Pos. 1 |
| Polarize $S_3$ and $S_4$ Position 2 | Conducts $V_g$ $V_s$ | Does not conduct $V_g$ $V_s$ | Conducts $V_g$ $V_s$ | Does not conduct $V_g$ $V_s$ | $V_g = +29V$ $V_sD = +29V$ $S_1$ Pos. 1 $S_2$ Pos. 1 | $V_g = +29V$ $V_sD = -21V$ $S_1$ Pos. 2 $S_2$ Pos. 2 |
| Readout $(V_{FB} \cdot V_D)^2$ $S_3$ and $S_4$ Position 3 | | | Does not conduct $V_g$ $V_s$ | Conducts $V_g$ $V_s$ | | $V_g = 0$ $V_s = 0$ $V_D = V_{EI}$ |
| Readout $V_{FB}^2$ $S_3$ and $S_4$ Position 4 | | | Does not conduct $V_g$ $V_s$ | Conducts $V_g$ $V_s$ | | $V_g = 0$ $V_s = 0$ $V_D = +21V$ |

through $M_{mn}$ of the matrix LM1 are grounded. The currents which flow through respective resistors R and the intelligence injected into memory M then measures Expression 10.

$$-\sum_{j=n}^{j=n} V_{FB_{ij}} \cdot V_{D_{ij}}$$

for each row *i*.

Switches $S_1$, $S_2$, $S_3$ are now moved to position 4. In position 4 of switch 1 all sources S of $T_3$ and of the minstors are connected to the associated resistors R', and through them to the ground, and to square root derivers SR. Through $S_2$ the gates of $T_2$ and $T_3$ are connected to +21 volts. As in position 3, $T_1$ is non-conducting and $T_2$ conducting. Through $S_4$ the gates of all minstors $M_{11}$ through $M_{mn}$ are grounded of the asso- As described above, the comparison-characteristic data is applied to all minstors $M_{11}$ through $M_{mn}$. An alternative approach is to compare each new pattern of comparison-characteristics with all patterns which were impressed before the new pattern. If this approach is adopted, the second pattern is evaluated against the pattern in the first row and is impressed on the second row only if it differs; the third to the *m*th patterns are likewise evaluated against earlier patterns and are inserted in the third to *m*th rows if they differ from earlier patterns. The evaluation is carried out similarly to evaluation of the actual characteristics against the comparison characteristics.

Figure 8A:
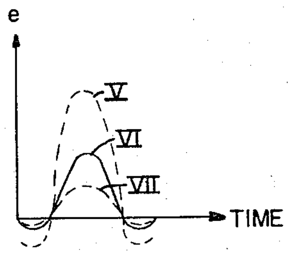
FIGS. 8A, B, C are graphs illustrating a feature of the apparatus shown in FIG. 7.
Figure 8B:
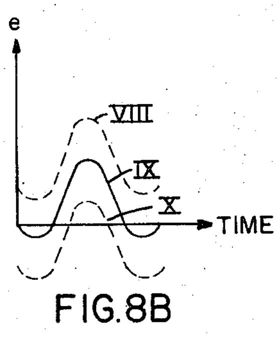
Figure 8C:
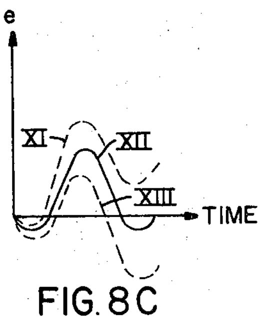

The minimum-angle data derived from the apparatus shown in FIG. 7 is invariant under an affine transformation. In addition, differentiation of the input actual-characteristic pattern renders and data invariant with respect to shifting and shearing. This may be understood with reference to FIGS. 8A, B, C. In each graph $e$ is plotted vertically and time horizontally. It is assumed in each case that $e$ is sampled over a time interval. If, during successive operations, e changes as represented by curves V, VI, VII of FIG. 8A, the angle between the vectors remains unaffected since the ratio between the vectors $e$ for each curve is the same as for other curves. If the input patterns follow curves VIII, IX, X, of FIG. 8B, differentiation of the input removes the differences. Curves XI, XII, XIII of FIG. 8C represent a combination of the curves of FIG. 8A and FIG. 8B, and differences can be removed by differentiation. The invariance illustrated in FIGS. 8A, B, C is particularly advantageous where the characteristics are simulated digitally.

Figure 5:
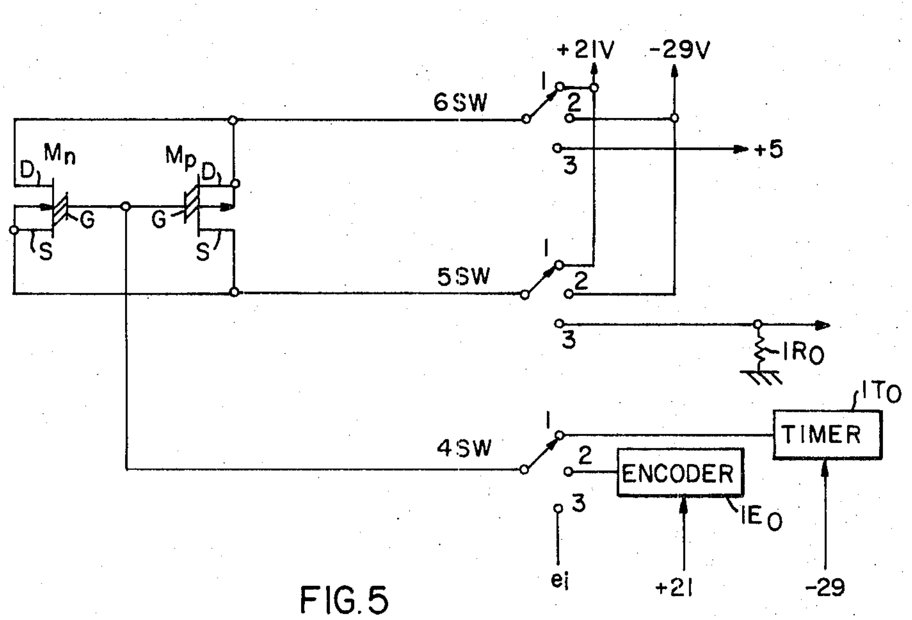
FIG. 5 is a fragmental schematic showing the application of erase, classify or read-out, and write voltages to a minstor pair in the practice of this invention in the determination of the distance between the comparison characteristics and the actual-characteristics vectors.

Evaluation by comparison of Euclidean distances can be carried out by application of Expression 11 with a matrix in which the adaptive elements are single minstors. Typically, such an evaluation can be used where each actual characteristic deviates in only one sense, positive or negative, from the corresponding comparison-characteristic. However, a matrix in which the adaptive elements are pairs P of complementary minstors, as shown in FIG. 5, has unique advantage over the single-minstor matrix and the minstor-pair matrix will be described in detail here. FIG. 5 shows the minstor circuit on which the matrix operation is based.

The apparatus shown in FIG. 5 includes the pair P of minstors $M_n$ and $M_p$ connected in anti-parallel or inversely; that is, with the drain D of $M_n$ connected to the source S of $M_p$ and the source S of $M_n$ connected to the drain D of $M_p$. The gates G are connected together. This apparatus also includes the switches 4SW, 5SW and 6SW, each of which has three positions, 1, 2, 3, and which operate together and at any time are in the same position. Position 1 is the erase position, position 2 the write or polarize position, the position 3 the readout, classify or comparison position.

In position 1 of switches 4SW through 6SW, +21 volts, typically, is impressed on the source S and drain D of each minstor $M_n$ and $M_p$ and −29 volts, typically, is impressed through a timer $1T_o$ on the gates G. The timer $1T_o$ is set to apply the 50 volts between the gates G and the other electrodes S and D for a long enough time interval to erase any prior flat-band voltages from the gates G (FIG. 2, curves III, IV). In position 2 of switches 4SW through 6SW, −29 volts is impressed on the sources S and drains D and +21 volts is impressed on the gates G through an encoder $1E_o$. The encoder $1E_o$ is a timer set to apply the 50 volts for an interval corresponding to the comparison intelligence $W_i$ which is to be impressed as a flat-band voltage on the gates G. The voltage impressed may represent analog or digital magnitudes as the subject under comparison demands. In position 3 of the switches 4SW through 6SW the actual intelligence $e_i$, which is to be compared with the comparison intelligence $W_i$, is impressed on the gates G, and a voltage of +5 volts, typically, is impressed between the source S and the drains D. This +5 volts produces saturation currents $I_{DSAT}$ of opposite polarity between the respective sources S and drains D of the minstors $M_n$ and $M_p$, the net current flowing through resistor $1R_o$.

Figure 6:
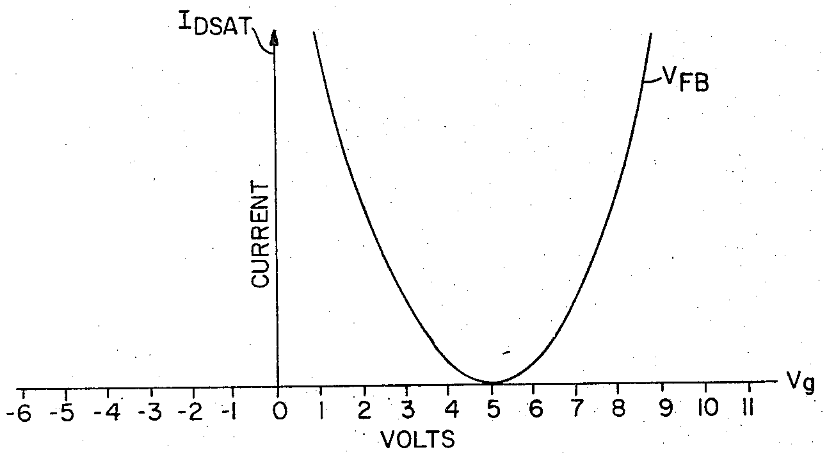
FIG. 6 is a graph showing the manner in which the saturation current of a minstor varies as a function of the gate voltages in the determination of the distance between the comparison-characteristics and actual-characteristics vectors.

The current $I_{DSAT}$ is governed by Equation (11):

$$I_{DSAT} = (\mu \text{ w } C/2L)(V_g - V_{FB})^2$$

which is the equation for a parabola with $I_{DSAT}$ as the dependent variable and, for any $V_{FB}$, $V_g$ as the independent variable. Such a parabola is plotted in FIG. 6 with $I_{DSAT}$ as ordinate and $V_g$ as abscissa. The apex of the parabola is at ($V_g = V_{FB}$); $V_{FB}$ is sometimes referred to as the threshold voltage. Assuming that $V_{FB}$ measures a comparison characteristic and $V_g$ an actual characteristic, $I_{DSAT}$ measures the square of the deviation in either sense of the actual characteristic from the comparison characteristic. The evaluation of a pattern of actual characteristics by the Euclidean distance between the actual-characteristic and comparison-characteristic vectors involves the determination of the sum of the squares of differences between the components of the vectors. The apparatus shown in FIG. 5 is uniquely applicable to such determination. A matrix LM2 incorporating this apparatus is shown in FIG. 9.

Figures 9, 11:
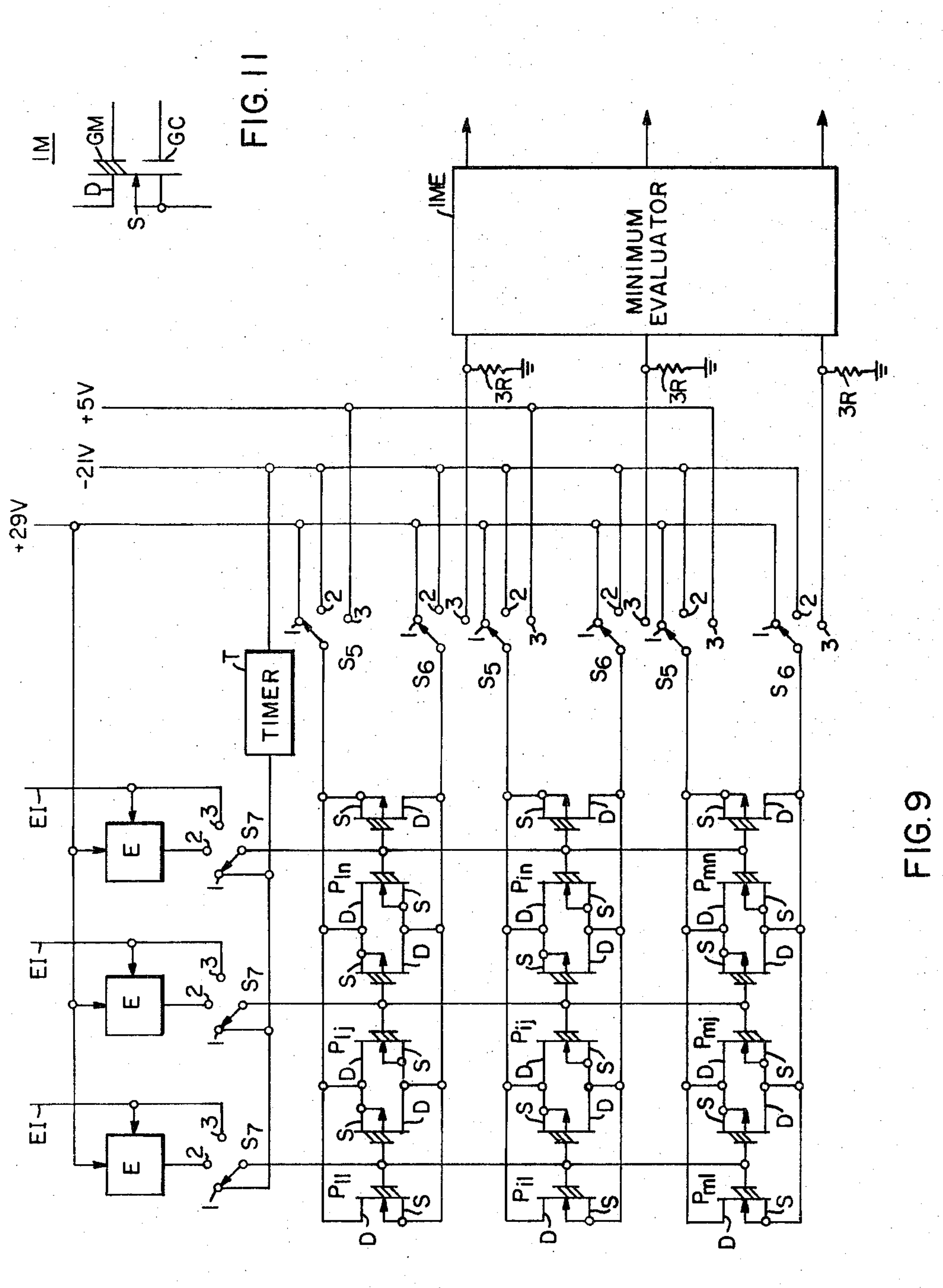
FIG. 9 shows apparatus according to this invention for determining the optimum Euclidian distance between comparison characteristics vectors and an actual-characteristics vector.
FIG. 11 is a schematic showing a minstor with a control gate as well as a memory gate which may be used in the practice of this invention.

The apparatus shown in FIG. 9 includes minstor pairs $P_{11}$ through $P_{mn}$, like the pair P of FIG. 5. The pairs are connected in columns $P_{11} - P_{m1}$, $P_{1j} - P_{mj}$, and $P_{1n} - P_{mn}$, and in rows $P_{11} - P_{1n}$, $P_{i1} - P_{in}$, and $P_{m1} - P_{mn}$. There are also encoders E and intelligence input conductors EI, a pair E, and EI being associated with each column of the matrix. Each conductor EI is connected to an associated encoder E to set its timing during the training period or "learning phase" of the matrix (usually when comparison-characteristic patterns are impressed). During the recognition phase of the matrix the voltages corresponding to actual characteristics are transmitted directly through conductors EI. A switch $S_7$, having positions 1, 2, 3, is associated with each column of the matrix. The wiper of each switch is connected respectively to the gates G of the pairs $P_{11} - P_{m1}$, $P_{1j} - P_{mj}$, $P_{1n} - P_{mn}$ of each column of the matrix. In position 1, each wiper is connected to −21 volts, through timer T, in position 2 to the output of the associated encoder E, and in position 3 directly to the associated conductor EI. A resistor 3R and switch $S_5$ and $S_6$ are associated with each row $P_{11} - P_{1n}$, $P_{i1} - P_{in}$, $P_{m1} - P_{mn}$ of the matrix. The wipers of each set $S_5$ and $S_6$ are respectively connected to the sources S and drains D and the drains D and sources S of the minstor pairs of each row. In position 1 each wiper of $S_5$ is connected to +29 volts, in position 2, to −21 volts, and in position 3 to +5 volts. In position 1 each wiper of $S_6$ is connected to +29 volts, in position 2, to −21 volts and in position 3 to resistor 3R and minimum evaluator 1ME. The intelligence supplied to 1ME is the drop across resistor 3R.

Operation of FIG. 9

At the start switches $S_5$, $S_6$ and $S_7$ are in position 1 and +29 volts is impressed on the sources S and drains D of all pairs $P_{11}$ through $P_{mn}$ while −21 volts is impressed on all gates through timer T. Previously impressed flat-band voltages are erased from all pairs $P_{11}$ through $P_{mn}$ as timer T times out.

The encoders E are set for a pattern of comparison characteristics by impressing appropriate signals on the associated conductors EI. Switches $S_7$ are set in position 2 and switches 5 and 6 for the first row of pairs, $P_{11}$ through $P_{1n}$, are set in position 2. Plus twenty-nine volts is impressed on the encoders E, −21 volts is impressed on the sources S and drains D of the pairs of the first row and +29 volts remain impressed on the sources and drains of the pairs of the other rows.

The gates of the pairs $P_{11}$ through $P_{1n}$ of the first row and charged with respective flat-band voltages determined by the timing out of the encoders E. The gates G of the other pairs are not affected because during timing the gates and the sources S and drains D are at the same potential, +29 volts. Switches $S_5$ and $S_6$ are returned to position 1 while switch 7 remains in position 2. The encoders E having timed out, the gates G of the pairs $T_{11}$ and $T_{1n}$ are not affected. The encoders E are now set for a second pattern by intelligence impressed on associated conductors EI. Switches 5 and 6 for the second row of pairs are set in position 2 and the gates G of the second row are charged with flat-band voltages corresponding to a second pattern. The same procedure is repeated for the other of the m rows.

Once the gates G of the rows of pairs $P_{11} - P_{1n}$, $P_{i1} - P_{in}$, $P_{m1} - P_{mn}$ are charged with first-band voltages corresponding to different patterns of comparison characteristics, an evaulation of a subject can be made by setting all switches $S_5$, $S_6$, $S_7$ in position 3 and impressing voltages corresponding to the actual characteristics on conductors EI. Switches $S_5$ impress +5 volts on one set (the upper) of sources S and drain D of each of the pairs $P_{11} - P_{1n}$, $P_{i1} - P_{in}$, $P_{m1} - P_{mn}$ of the rows and switch $S_6$ connects the other set each of sources and drains respectively to the resistors 3R. The drops across the resistors 3R are impressed across the minimum evaluator 1ME. The voltage impressed on each conductor EI is impressed on the gates G of the pairs $P_{11} - P_{mi}$, $P_{1j} - P_{mj}$, $P_{1n}$ $P_{mn}$, along the columns. The current through each resistor 3R is saturation current $I_{DSAT_i}$ and constitutes a measure of the square of the deviation of the actual-characteristics from the corresponding comparison-characteristics for the row $i$ corresponding to the resistor as defined in Equation 11:

$$I_{DSAT_i} = \frac{\mu w C}{2L} \sum_{j=1}^{j=n} (V_{g_{ij}} - V_{FB_{ij}})^2$$

$V_{g_{ij}}$ is a voltage measuring the actual characteristic impressed on the gates G of a pair $P_{ij}$ in column $j$ and row $i$, and $V_{FB_{ij}}$ is the flat-band voltage measuring a comparison characteristic impressed on the gates of this pair $P_{ij}$. The evaluator 1ME provides an indication of the pattern the sum of whose deviations squared is a minimum and thus of the pattern of comparison characteristics which correspond to the actual characteristics.

Figure 10:
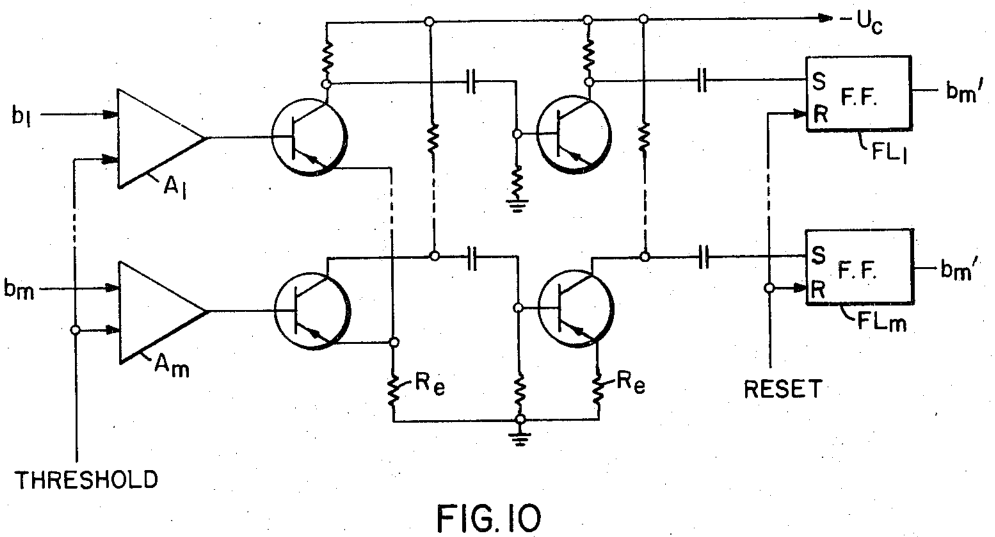
FIG. 10 is a schematic showing an evaluator which may be used in the practice of this invention.

A typical evaluator circuit is shown in FIG. 10. The outputs $b_1$ through $b_m$ from the rows 1 through $m$ are each impressed on an amplifier $A_1$ through $A_m$ in comparison relationship with a threshold magnitude. The signals which pass the threshold are each amplified and impressed on a flip-flop $F1_1$ through $F1_m$. The minimum or maximum may appear as a 1 and the others as 0. The 1 or 0 signals are passed as $b_1$ through $b_m$.

Additional flexibility is imparted to this invention by use of minstors 1M as shown in FIG. 11. Minstor 1M has a source S, drain D, memory gate GM and control gate GC. Typically, the control gate GC may be used in switching when a matrix is being charged and when an evaluation is being carried out with a charged matrix.

While preferred embodiments of this invention has been disclosed herein, many modifications thereof are feasible. This invention is not to be restricted except insofar as is necessitated by the prior art.

We claim:

1. Apparatus for classifying a subject from a plurality of its characteristics or features, the said apparatus comprising a learning matrix including plurality of transistor means, electrically disposed in columns and rows, each transistor means having gate means, source means, and drain means, and also having means for retaining on said gate means a flat-band voltage derived from a potential impressed on said gate means, each said row having output means, means connecting the source and drain means of the transistor means of 4ach row to its corresponding output means so that the drain currents for the transistor means of said last-named row are supplied in parallel to said output means, first impressing means, connected to the gate means of the transistor means of each row, for impressing on the respective gate means of said last-named transistor means of said last-named rows a set of comparison flat-band voltages, each voltage of said set corresponding to a comparison characteristic to be compared with one said plurality of characteristics, different flat-band voltages corresponding to different patterns of comparison characteristics being impressed on the respective gate means of the transistor means of different rows, second impressing means, connected to the transistor means of each said column, for impressing on the transistor means of each column, a voltage in comparison relationship with said comparison flat-band voltages impressed on the gate means of the transistor means of said last-named column, a voltage corresponding to one of said plurality of characteristics, and means connected to the output means of the rows of said columns for comparing, the drain currents conducted by the drain means of the transistor means of said different rows, with each other to compare the characteristics of said subject with the patterns of comparison characteristics in each row.

2. The apparatus of claim 1 including means, connected to the comparing means, for resetting the pattern of at least one of the rows in dependence upon a comparison carried out by said comparing means to achieve closer correspondence between the comparison characteristics of said last-named pattern of said plurality of characteristics.

3. The apparatus of claim 1 wherein each means is a having a gate, a source, and a drain, and the sources and the drains of the transistors of each column are connected substantially in parallel to the second impressing means and the second impressing means impresses on the sources and drains of the transistors of each column a voltage corresponding to one of the plurality of characteristics, the said voltage being substantially less than the saturation voltage for said last-named minstor.

4. The apparatus of claim 1 wherein the second impressing means is connected to impress on the gate means of the transistor means of each column, a voltage, corresponding to one of the plurality of characteristics, in comparison relationship with the comparison flat-band voltage impressed on said last-named gate means, the said apparatus also including means for impressing a saturation source-drain voltage on the transistor means when the drain currents of the rows are compared.

5. The apparatus of claim 4 wherein each transistor means is a pair of transistors of opposite polarity, each of the last-named transistors having a substrate, a source and a drain, the gates of each pair being connected together and the source and the drain of one transistor of the pair being connected to conduct drain current to the output of opposite polarity to the drain current conducted to the other minstor of the pair.

6. The method of operating a learning matrix to classify a subject in accordance with its characteristics or features, the adaptive elements of said matrix being transistor means, each transistor means having gate means, source means, drain means, and substrate means and also having means for retaining a flat-band voltage derived from a potential impressed on said gate means, the transistor means being electrically disposed in columns and rows, the said method comprising erasing any flat-band voltage previously impressed on each transistor means of each row in its turn, by impressing an erasing voltage of appropriate first polarity for an appropriate time interval between the gate means connected to one pole of said voltage and the substrate means connected to the opposite pole of said voltage, thereafter impressing on each transistor means, in its turn, of each row, in its turn, a comparison-characteristic flat-band voltage corresponding to one of said characteristics of said subject, by impressing an appropriate writing voltage, for a time interval corresponding to said characteristic, between the gate means of said last-named transistor means connected to one pole of said writing voltage and the substrate means of said last-named transistor means to the opposite pole of said writing voltage, a pattern of characteristic flat-band voltages corresponding to a pattern of comparison characteristics of said subject being impressed on the transistor means of each said row, in its turn, the said pattern for each said row differing from the pattern for other said rows, impressing simultaneously on the transistor means of each of said columns an actual-characteristic voltage, corresponding to different ones of said characteristics of said subject, in comparison relationship with the comparison-characteristic flat-band voltages impressed on the transistor means of said columns, and comparing the total drain currents conducted by the transistor means of each row with the drain currents conducted by the transistor means of the other rows to identify the row conducting the optimum (maximum or minimum) drain current.

7. The method of claim 6 wherein the actual-characteristic voltage is impressed between the source means and the drain means of transistor means in each column and the gate means is maintained at a reference potential while the drain currents are being compared.

8. The method of claim 7 wherein the drain currents for the rows are compared by measuring a first drain current for each row while the actual-characteristic voltages are impressed between the source means and the drain means of each transistor means of said last-named row, measuring a second drain current for said last-named row, while saturation voltage is impressed between the source means and the drain means of the transistor means of said last-named row, deriving the square root of the magnitude of the second drain current, dividing said square root into the magnitude of the first drain current to derive a quotient, and determining for which row said quotient is a maximum.

9. The method of claim 6 wherein the actual-characteristic voltage is impressed on the gate means of the transistor means in each column in counter-acting relationship with the comparison-characteristic flat-band voltage and the drain currents for the rows are compared while saturation voltage is impressed between the source means and the drain means of the transistor means of each row.

10. The method of operating a learning matrix to classify a subject in accordance with its characteristics, the adaptive elements of said matrix being transistors, each transistor having a gate, a source, a drain and a substrate and also having means for retaining on said gate a flat-band voltage derived from a potential impressed between said gate and said substrate, the said transistors being electrically disposed on said matrix in columns and rows, the said method comprising erasing any flat-band voltages earlier impressed on the gates of said transistors, impressing, on the gates of the transistors of each of a plurality of said rows, a set of flat-band voltages defining for each row a pattern of comparison characteristics corresponding to said characteristics of said subject, the flat-band voltage impressed on the gate of each transistor of a row corresponding to a characteristic of said subject and the set of flat-band voltages for each row defining a multidivisional vector whose components are the individual flat-band voltages impressed on the gates of said transistors of said last-named row, impressing a voltage corresponding to an actual characteristic of said subject on the transistors along a corresponding column of each of said plurality of rows in comparison relationship with the flat-band voltages impressed on the gates of said last-named transistors, the actual-characteristic voltages so impressed on the transistors of each row of said plurality of rows constituting a multidimensional vector whose components are said actual-characteristic voltages, determining electrically, for each row of said plurality of rows, the angle between the flat-band voltage vector and the actual characteristic voltage vector, and classifying the subject as in the class of the row of said plurality of rows for which said angle is an optimum.

11. The method of operating a learning matrix to classify a subject in accordance with its characteristics, the adaptive elements of said matrix being transistor means, each transistor means having gate means, source means, drain means, and substrate means, and also having means for retaining on said gate means a flat-band voltage derived from a potential impressed between said gate eans and substrate means, the said transistor means being electrically disposed in said matrix in columns and rows, the said method comprising erasing any flat-band voltages earlier impressed on said gate means of said transistor means, impressing, on the respective gate means the transistor means of each of a plurality of rows, a set of flat-band voltages defining for each row a pattern of comparison characteristics corresponding to said characterisitcs of said subject, the flat-band voltage impressed on the gate means of each transistor means of a row corresponding to a characteristic of said subject and the set of flat-band voltages for each row defining a multidimensional vector whose components are the individual flat-band voltages impressed on the gate means of the transistor means of said last-named row, impressing a voltage corresponding to an actual characteristic of said subject on the transistor means, along a corresponding column of each of said plurality of rows, in comparison relationship with the flat-band voltages impressed on the gate means of said last-named transistor means, the actual-characteristic voltage so impressed on the transistor means of each row of said plurality of rows constituting a multidimensional vector whose components are said actual-characteristic voltages, determining electrically, for each row of said plurality of rows, the Euclidean distance between the flat-band voltage vector and the actual-characteristic voltage vector, and classifying said subject as in the class of the row of said plurality of rows for which the Euclidean distance is a minimum.

* * * * *